US008909747B2

(12) United States Patent
Steiner et al.

(10) Patent No.: US 8,909,747 B2
(45) Date of Patent: Dec. 9, 2014

(54) METHOD AND APPARATUS FOR LOCALIZATION IN PEER-TO-PEER SYSTEMS

(75) Inventors: Moritz M. Steiner, Red Bank, NJ (US); Kyung Hwa Kim, New York, NY (US); Matteo Varvello, Port Monmouth, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 336 days.

(21) Appl. No.: 13/034,277

(22) Filed: Feb. 24, 2011

(65) Prior Publication Data

US 2012/0221692 A1 Aug. 30, 2012

(51) Int. Cl.
*G06F 15/16* (2006.01)
*G06F 15/177* (2006.01)
*H04L 29/08* (2006.01)
*G06F 15/173* (2006.01)

(52) U.S. Cl.
CPC .......... *H04L 67/1046* (2013.01); *H04L 67/107* (2013.01); *H04L 67/1059* (2013.01)
USPC ............ 709/222; 709/218; 709/225; 709/231

(58) Field of Classification Search
USPC ......................................... 709/222
See application file for complete search history.

(56) References Cited

U.S. PATENT DOCUMENTS

| | | | |
|---|---|---|---|
| 6,456,600 B1 * | 9/2002 | Rochberger et al. ........ | 370/255 |
| 6,879,574 B2 * | 4/2005 | Naghian et al. ............... | 370/338 |
| 6,950,820 B2 * | 9/2005 | Bae ............................... | 709/225 |
| 7,042,867 B2 * | 5/2006 | Whitehill et al. ............. | 370/338 |
| 7,065,579 B2 * | 6/2006 | Traversat et al. ............. | 709/230 |
| 7,170,853 B2 * | 1/2007 | Remboski et al. ............ | 370/225 |
| 7,177,867 B2 * | 2/2007 | Stringer-Calvert et al. .......... | 1/1 |
| 7,177,951 B1 * | 2/2007 | Dykeman et al. ............. | 709/249 |
| 7,194,564 B2 * | 3/2007 | Hauck et al. .................. | 710/104 |
| 7,197,565 B2 * | 3/2007 | Abdelaziz et al. ............ | 709/226 |
| 7,478,120 B1 * | 1/2009 | Zhang ........................... | 709/201 |

(Continued)

OTHER PUBLICATIONS

Mar. 29, 2012 Notification of Transmittal of the International Search Report and the Written Opinion of the International Searching Authority, or the Declaration, in PCT/US2012/024292, Alcatel-Lucent USA Inc., Applicant, 9 pages.

(Continued)

*Primary Examiner* — Melvin H Pollack
(74) *Attorney, Agent, or Firm* — Wall & Tong LLP

(57) ABSTRACT

A multi-layer peer-to-peer (P2P) capability is provided. A multi-layer P2P system includes a plurality of P2P networks associated with a plurality of hierarchical layers. For example, a first hierarchical layer may include a first P2P network including all peer nodes of the P2P system, and a second hierarchical layer may include a plurality of second P2P networks where the second P2P networks of the second hierarchical layer include respective subsets of the peer nodes of the first P2P network. The second P2P networks of the second hierarchical layer may be organized based on one or more characteristics (e.g., the geographic locations of the peer nodes, the Internet Service Providers (ISPs) with which the peer nodes are associated, and the like). A node participating in the P2P system joins the first P2P network of the P2P system and one of the second P2P networks of the P2P system. The node may then interact with the first P2P network and/or the second P2P network for performing various functions within the P2P system.

19 Claims, 6 Drawing Sheets

(56) References Cited

U.S. PATENT DOCUMENTS

| | | | |
|---|---|---|---|
| 7,827,279 B2* | 11/2010 | Xu et al. | 709/225 |
| 8,046,328 B2* | 10/2011 | Rhodes et al. | 707/622 |
| 8,161,116 B2* | 4/2012 | Chaddha et al. | 709/206 |
| 8,176,189 B2* | 5/2012 | Traversat et al. | 709/230 |
| 8,185,096 B2* | 5/2012 | Smith et al. | 455/414.1 |
| 8,189,568 B2* | 5/2012 | Qiu et al. | 370/352 |
| 8,204,992 B2* | 6/2012 | Arora et al. | 709/226 |
| 8,359,397 B2* | 1/2013 | Traversat et al. | 709/230 |
| 2007/0250590 A1* | 10/2007 | Flannery et al. | 709/217 |
| 2010/0070448 A1* | 3/2010 | Omoigui | 706/47 |
| 2010/0146094 A1* | 6/2010 | Elkayam et al. | 709/223 |
| 2011/0131278 A1* | 6/2011 | Nieh et al. | 709/204 |
| 2011/0131335 A1* | 6/2011 | Spaltro et al. | 709/228 |
| 2013/0066931 A1* | 3/2013 | Lacapra et al. | 707/827 |

OTHER PUBLICATIONS

Fabio Picconi and Laurent Massoulie: "ISP-friend or foe? Making P2P live streaming ISP-aware," Internet Citation, Nov. 27, 2008, page Complete, XP007909830, Retrieved from the Internet: URL:http://www.thlab.net/~picconi/CR-PRL-2008-11-0001.pdf (retrieved on Sep. 18, 2009).

I. Stoica et al., "Chord: A Scalable Peer-to-Peer Lookup Service for Internet Applications," SIGCOMM'01, Aug. 27-31, 2001, San Diego, CA.

I.Stoica et al., "Chord: A Scalable Peer-to-Peer Lookup Service for Internet Applications," Jan. 10, 2002.

I.Stoica et al., "Chord: A Scalable Peer-to-Peer Lookup Protocol for Internet Applications," IEEE/ACM Transactions on Networking, vol. 11, Issue 1, Feb. 2003.

A.Rowstron and P. Druschel, "Pastry: Scalable Decentralized Object Location and Routing for Large-Scale Peer-to-Peer Systems," Proceedings of 18$^{th}$ IFIP/ACM International Conference on Distributed Systems Platforms. Heidelberg, Germany, Nov. 2001.

B. Zhao et al., "Tapestry: A Resilient Global-Scale Overlay for Service Deployment," IEEE Journal on Selected Areas in Communications, vol. 22, No. 1, Jan. 2004.

S. Ratnasamy et al., "A Scalable Content Addressable Network," SIGCOMM'01, Aug. 27-31, 2001, San Diego, CA.

T. P. Chu, R. Nagarajan, "Method and Apparatus for Decomposing a Peer-to-Peer Network and Using a Decomposed Peer-to-Peer Network," U.S. Appl. No. 12/640,049, filed Dec. 17, 2009.

T. P. Chu, R. Nagarajan, "Method and Apparatus for Locating Services Within Peer-to-Peer Networks," U.S. Appl. No. 12/640,072, filed Dec. 17, 2009.

* cited by examiner

METHOD AND APPARATUS FOR LOCALIZATION IN PEER-TO-PEER SYSTEMS

FIELD OF THE INVENTION

The invention relates generally to communication networks and, more specifically but not exclusively, to peer-to-peer systems.

BACKGROUND

Peer-to-Peer (P2P) file sharing applications account for a large fraction of the traffic on the Internet, and use of P2P file sharing applications is expected to increase in the future. Disadvantageously, however, existing P2P file sharing applications are unaware of the topology of the underlying network. As a result, a first node that is located at a first geographic location may attempt to download a file from a second node located at a second geographic location which may be quite remote from the first geographic location, even though that file may be available from one or more other nodes located closer to the first geographic location of the first node. Furthermore, the first node and second nodes may receive service from different Internet Service Providers (ISPs), such that the ISP of the first node will need to pay for the traffic required to transport the file from the second node to the first node. For example, a node located in New York City and associated with a first ISP may download a file from a node located in Tokyo and associated with a second ISP, even though another node located near New York City and associated with the first ISP also may have that file available.

SUMMARY

Various deficiencies in the prior art are addressed by embodiments of a multi-layer peer-to-peer (P2P) capability.

In one embodiment, an apparatus for use by a node in a P2P system includes a processor configured to initiate a request to join a first P2P network of the P2P system, initiate a request to join a second P2P network of the P2P system, and maintain information associated with the P2P system wherein the information associated with the P2P system includes a first set of configuration information configured for interaction by the node with the first P2P network and a second set of configuration information configured for interaction by the node with the second P2P network. The first P2P network includes a plurality of peer nodes, and the second P2P network includes a subset of the peer nodes of the first P2P network.

In one embodiment, a method for use by a node in a P2P system includes initiating a request to join a first P2P network of the P2P system, initiating a request to join a second P2P network of the P2P system, and maintaining information associated with the P2P system wherein the information associated with the P2P system includes a first set of configuration information configured for interaction by the node with the first P2P network and a second set of configuration information configured for interaction by the node with the second P2P network. The first P2P network includes a plurality of peer nodes, and the second P2P network includes a subset of the peer nodes of the first P2P network.

In one embodiment, a computer readable storage medium stores instructions which, when executed by a computer, cause the computer to perform a method for use by a node in a P2P system where the method includes initiating a request to join a first P2P network of the P2P system, initiating a request to join a second P2P network of the P2P system, and maintaining information associated with the P2P system wherein the information associated with the P2P system includes a first set of configuration information configured for interaction by the node with the first P2P network and a second set of configuration information configured for interaction by the node with the second P2P network. The first P2P network includes a plurality of peer nodes, and the second P2P network includes a subset of the peer nodes of the first P2P network.

In one embodiment, an apparatus for use by a node for participating in a P2P system includes a memory and a processor. The memory is configured to store a first set of configuration information for interaction by the node with a first P2P network of the P2P system, where the first P2P network includes a plurality of peer nodes. The memory is configured to store a second set of configuration information for interaction by the node with a second P2P network of the P2P system, where the second P2P network includes a subset of the peer nodes of the first P2P network. The processor is configured to control interaction by the node with the first P2P network using the first set of configuration information and to control interaction by the node with the second P2P network using the second set of configuration information.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

Figure 1:
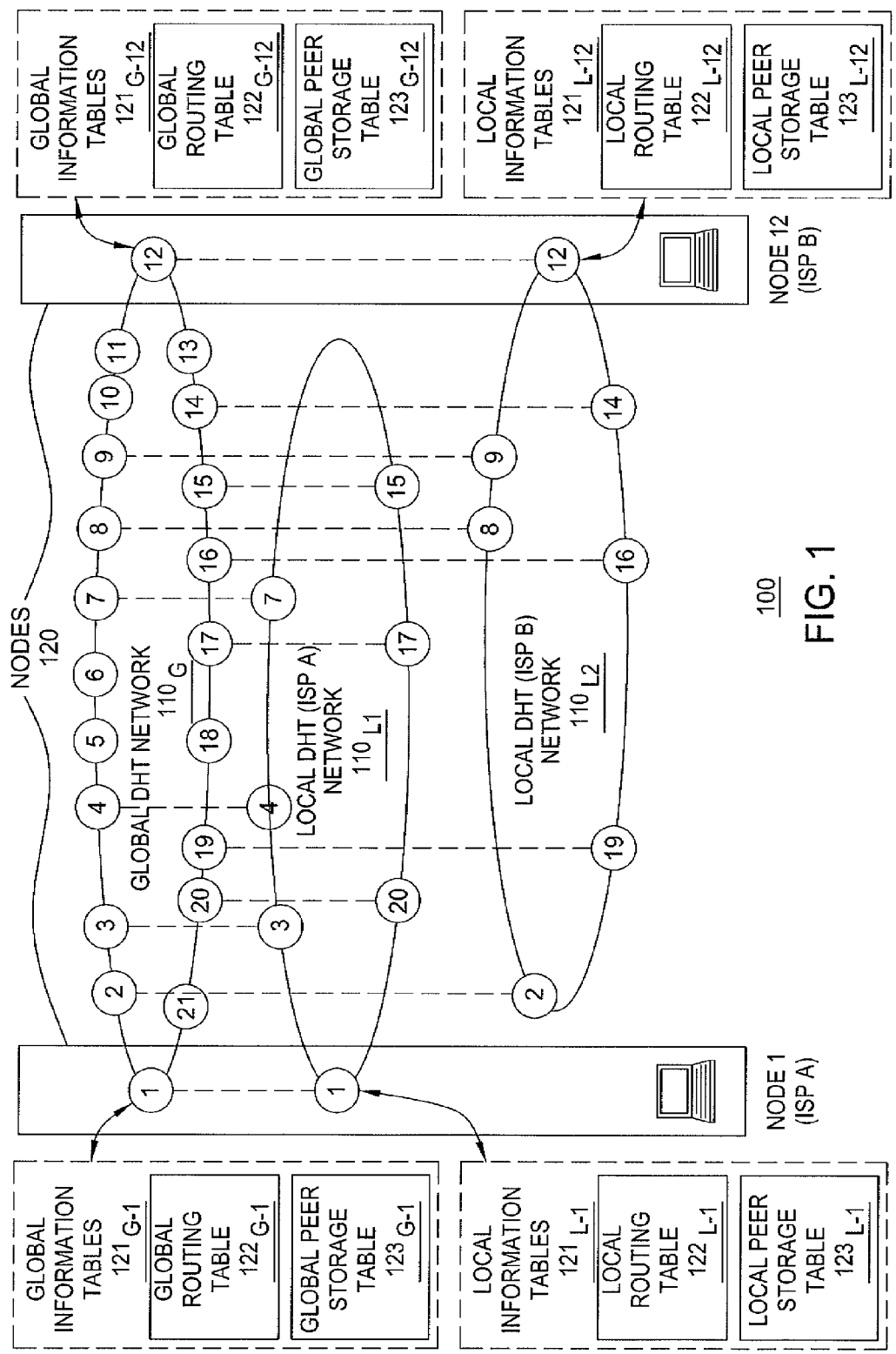
FIG. 1 depicts an exemplary multi-layer Distributed Hash Table (DHT) system configured for providing localization of P2P functions.

In general, a multi-layer peer-to-peer (P2P) capability is depicted and described herein, although it will be appreciated that various other capabilities also may be disclosed.

In at least some embodiments, a multi-layer P2P system includes a plurality of P2P networks associated with a plurality of hierarchical layers. For example, a first hierarchical layer may include a first P2P network including all peer nodes of the P2P system, and a second hierarchical layer may include a plurality of second P2P networks where the second P2P networks of the second hierarchical layer include respective subsets of the peer nodes of the first P2P network. The second P2P networks of the second hierarchical layer may be organized based on one or more characteristics (e.g., the Internet Service Providers (ISPs) with which the peer nodes are associated, the geographic locations of the peer nodes, and the like). In at least some such embodiments, a node participating in the P2P system joins the first P2P network of the P2P system and one of the second P2P networks of the P2P system (e.g., based on one or more characteristics associated with the node and the one or more characteristics associated with the second P2P networks), and the node may then interact with the first P2P network and/or the second P2P network for performing various functions within the P2P system.

In at least some embodiments, the multi-layer P2P capability provides a multi-layer P2P system, based on a hierarchical P2P architecture, to achieve P2P localization results (e.g., P2P lookup localization, P2P traffic localization, and like capabilities and associated advantages, as well as various combinations thereof).

In at least some embodiments, the multi-layer P2P capability supports P2P localization, while avoiding various problems typically associated with attempts to provide P2P localization, by providing additional P2P networks at one or more additional layers of a P2P system to provide thereby a multi-layer P2P system. This advantageously avoids changes to existing P2P architectures which could potentially remove benefits of the existing P2P architectures (e.g., such as removing randomness, scalability, and/or performance typically associated with P2P networks that are based on Distributed Hash Tables (DHTs)). This also advantageously ensures compatibility with existing P2P systems, thereby ensuring feasibility in applying embodiments of the multi-layer P2P capability to widely deployed P2P applications which already have millions of associated end users. Various embodiments of the multi-layer P2P capability may have various other advantages associated therewith.

In at least some embodiments, the multi-layer P2P capability supports P2P localization in a manner that provides advantages to service providers (e.g., Internet Service Providers (ISPs) and/or other service providers) and end users.

Although primarily depicted and described herein with respect to embodiments in which the multi-layer P2P capability is provided using a DHT-based system having DHT networks, it is noted that the multi-layer P2P capability may be provided using any other suitable type(s) of P2P networks.

Various embodiments of the multi-layer P2P capability may be better understood by way of reference to the exemplary multi-layer DHT system of FIG. 1.

FIG. 1 depicts an exemplary multi-layer DHT system configured for providing P2P traffic localization for a P2P system.

As depicted in FIG. 1, exemplary multi-layer DHT system 100 includes two layers. Namely, exemplary multi-layer DHT system 100 includes a global layer and a local layer, which may be referred to collectively herein as layers. It is noted that a multi-layer DHT system may include more than two layers.

As depicted in FIG. 1, exemplary multi-layer DHT system 100 includes a plurality of DHT networks 110, including a global DHT network $110_G$ (which is associated with the global layer) and two local DHT networks $110_{L1}$ and $110_{L2}$ (collectively, local DHT networks $110_L$, which are associated with the local layer). The global DHT network $110_G$ and local DHT networks $110_L$ may be referred to collectively as DHT networks 110. Although primarily depicted and described herein within respect to embodiments in which the global DHT network $110_G$ and local DHT networks $110_L$ are implemented as DHT-based networks, it is noted that global DHT network $110_G$ and/or local DHT networks $110_L$ may be implemented using any other suitable type(s) of P2P networks.

Although primarily depicted and described herein with respect to a multi-layer DHT system including a specific number of layers having specific scopes (e.g., global, local) and specific numbers of DHT networks (e.g., one at the root layer and two at the sub-layer) associated therewith, it is noted that a multi-layer DHT system may include any suitable number of layers having any suitable scope(s) and any suitable numbers of DHT networks associated therewith.

As further depicted in FIG. 1, the exemplary multi-layer DHT system 100 includes a plurality of nodes 120 (illustratively, numbered as nodes 1 though 21) which participate in exemplary multi-layer DHT system 100. The nodes 120 may include any nodes which may participate in a P2P system. For example, the nodes 120 may be end user devices, such as computers, smartphones, and the like.

The global DHT network $110_G$ is a logical network that would normally be used to provide the P2P system in the absence of local DHT networks $110_L$. The typical operation of a DHT network will be understood by one skilled in the art. The global DHT network $110_G$ includes all nodes 120 participating in the P2P system (illustratively, each of nodes 1 through 21). A node 120, in order to access the P2P system, joins the global DHT network $110_G$.

The local DHT networks $110_L$ are logical overlay networks, each of which supports functions typically supported by a DHT network. The local DHT networks $110_L$ include respective subsets of the nodes 120 participating in the P2P system (i.e., respective subsets of the nodes 120 of the global DHT network $110_G$). The local DHT networks $110_L$ facilitate localization of DHT functions for the nodes 120. A node 120, in addition to joining the global DHT network $110_G$, also joins one of the local DHT networks $110_L$.

In general, the local DHT networks $110_L$ may be localized based on one or more characteristics of the nodes 120 participating in the P2P system. For example, local DHT networks $110_L$ may be localized based on one or more of the geographic locations of the nodes 120, the Internet Service Providers (ISPs) or other network access/service providers from which the nodes 120 receive service, and the like, as well as various combinations thereof. For example, where nodes 120 of the P2P system are expected to be located in Europe and Asia, a first local DHT network may formed for nodes 120 that are located in Europe and a second local DHT network may be formed for nodes that are located in Asia, such that each of the nodes 120 joins the local DHT network associated with its own geographic location. For example, where nodes 120 of the P2P system are expected to be associated with either a first ISP or a second ISP, a first local DHT network may formed for nodes 120 that receive network access via the first ISP and a second DHT network may be formed for nodes 120 that receive network access via the second ISP, such that each of the nodes 120 joins the local DHT network associated with its own ISP. It is noted that various other characteristics may be used for organizing the DHT networks of a DHT layer and, thus, for enabling nodes to join one of the DHT networks of a DHT layer.

In exemplary multi-layer DHT system 100, the local DHT networks $110_L$ are localized according to the Internet Service Provider (ISPs) which provide Internet service to the nodes 120 which participate in the multi-layer DHT system 100. Namely, local DHT network $110_{L1}$ is associated with a first ISP (denoted as ISP 1) and local DHT network $110_{L2}$ is associated with a second ISP (denoted as ISP 2). As noted above, the local DHT networks $110_L$ are logical overlay networks and, thus, may or may not be associated with any particular servers of the associated ISPs.

In this manner, by enabling each node 120 to join the global DHT network $110_G$ and one of the local DHT networks $110_L$, exemplary multi-layer DHT system 100 facilitates localization of DHT functions to be performed within the exemplary multi-layer DHT system 100.

Although primarily depicted and described herein with respect to an embodiment in which the multi-layer DHT system 100 includes a specific number of local DHT networks $110_L$ at the local layer, it will be appreciated that any suitable number of local DHT networks $110_L$ may be used at the local layer. More generally, it is noted that a layer of a multi-layer DHT system may include more than two DHT networks.

Although primarily depicted and described herein with respect to an embodiment in which local DHT networks $110_L$ are localized based on a specific characteristic (namely, based on the ISPs of the nodes 120), it will be appreciated that local DHT networks $110_L$ may be localized based on any suitable characteristic or characteristics.

In one embodiment, in order to form a multi-layer DHT system, such as exemplary multi-layer DHT system 100, each node 120 joins multiple DHT networks 110. In the exemplary multi-layer DHT system 100, each node 120 joins the global DHT network $110_G$ and also joins one of the local DHT networks $110_L$ (illustratively, the local DHT network $110_L$ that is associated with the ISP from which the node 120 receives service). A node 120 may join the global DHT network $110_G$ and its local DHT network $110_L$ at any suitable time (e.g., when the associated P2P application is launched on the node 120 or in response to any other suitable trigger condition).

As depicted in FIG. 1, each of the nodes 1 through 21 has joined the global DHT network $110_G$. The nodes 1, 3, 4, 7, 15, 17, and 20, each of which is served by the first ISP, have each joined both the global DHT network $110_G$ and the local DHT network $110_{L1}$ associated with the first ISP. The nodes 2, 8, 9, 12, 14, 16, and 19, each of which is served by the second ISP, have each joined both the global DHT network $110_G$ and the local DHT network $110_{L2}$ associated with the second ISP. It will be appreciated that the depiction of multiple circles having the same number indicates that the associated physical node 120 has joined multiple DHT networks 110 and thus is logically represented within those multiple DHT networks 110. This is clear from the depiction, in FIG. 1, of physical node 1 (associated with ISP 1) and physical node 12 (associated with ISP 12), where physical node 1 includes two circles including the identifier "1" (one being representative of the inclusion of node 1 in global DHT network $110_G$ and the other being representative of the inclusion of node 1 in local DHT network $110_{L1}$) and, similarly, where physical node 12 includes two circles including the identifier "12" (one being representative of the inclusion of node 12 in global DHT network $110_G$ and the other being representative of the inclusion of node 12 in local DHT network $110_{L2}$).

In general, each node 120, upon joining both the global DHT network $110_G$ and its local DHT network $110_L$, may interact with the DHT networks 110 for performing functions typically performed by nodes upon joining a DHT network of a DHT system.

In one embodiment, a node, upon joining both the global DHT network $110_G$ and its local DHT network $110_L$ of the exemplary multi-layer DHT system 100, stores configuration information that is configured for use by the node 120 in interacting with global DHT network $110_G$ and its local DHT network $110_L$. The configuration information includes a first set of configuration information for interaction by the node 120 with a first DHT network of the DHT system (illustratively, global DHT network $110_G$) and a second set of configuration information for interaction by the node 120 with a second DHT network of the P2P system (illustratively, its local DHT network $110_L$). This configuration information is configured for use by a processor of the node 120 for interaction with the global DHT network $110_G$ and its local DHT network $110_L$. In such embodiments, a set of configuration information for a DHT network 110 may include any suitable types of information for use by the node 120 in interacting with the DHT network (e.g., a list of peer nodes of the DHT network, routing information associated with the DHT network, and the like, as well as various combinations thereof).

In one embodiment, as depicted in FIG. 1, each node 120 maintains two sets of information tables 121 associated with the two DHT networks 110 that the node 120 joins, respectively. In general, the set of information tables 121 of a node 120 for a given DHT network 110 may include a routing table and a peer storage table. For example, node 1 includes: (1) a set of global DHT information tables $121_{G-1}$ including a global routing table $122_{G-1}$ and a global peer storage table $123_{G-1}$ for global DHT network $110_G$ and (2) a set of local DHT information tables $121_{L-1}$ including a local routing table $124_{L-1}$ and a local peer storage table $123_{L-1}$ for its local DHT network $110_{L1}$. Similarly, for example, node 12 includes: (1) a set of global information tables $111_{G-12}$ including a global routing table $122_{G-12}$ and a global peer storage table $122_{G-12}$ for global DHT network $110_G$ and (2) a set of local DHT information tables $121_{L-12}$ including a local routing table $122_{L-12}$ and a local peer storage table $123_{L-12}$ for its local DHT network $110_{L2}$. For a node 120, the set of global DHT information tables $121_G$ and set of local information tables $121_L$ may be referred to collectively as sets of information tables 121, the global routing table $122_G$ and local routing table $122_L$ may be referred to as routing tables 122, and the global peer storage table $123_G$ and local peer storage table $123_L$ may be referred to as peer storage tables 123.

A node 120, upon joining the global DHT network $110_G$ and its local DHT network $110_L$, determines respective routing tables 122 for the two DHT networks 110 that it joins. Namely, the node 120 determines a global routing table $122_G$ for the global DHT network $110_G$ and determines a local routing table $122_L$ for its local DHT network $110_L$. In general, a routing table 122 of a node 120 for a DHT network 110 includes routing information for use by the node 120 in communicating with other nodes 120 of the DHT network 110 (e.g., a set of links from the node 120 to other nodes of the DHT network 110).

A node 120, upon joining both the global DHT network $110_G$ and a local DHT network $110_L$, determines respective peer node tables 123 for the two DHT networks 110 that it joins. For example, upon joining both the global DHT network $110_G$ and the local DHT network $110_L$, the node 120 may send at least some messages (e.g., file announce messages, file query messages, and the like) to both the global DHT network $110_G$ and its local DHT network $110_L$. As a result, the node 120 is able to maintain two distinct lists of peer nodes from the two DHT networks 110; namely, a local peer storage table $123_L$ for identifying peer nodes 120 of local DHT network $110_L$ and a global peer node table $123_G$ for identifying peer nodes 120 of global DHT network $110_G$ (which may include local peer nodes as well as random peer nodes associated with other local DHT networks $110_L$). As a result, if a node 120 is unable to find a local peer node for a P2P function to be performed, the node 120 will still have an opportunity to obtain a list of random global peer nodes for use in performing the P2P function.

In one embodiment, although each node 120 joins the global DHT network 110$_G$ and a local DHT network 110$_L$, the DHT networks 110 do not share routing and peering information with each other. Similarly, in one embodiment, although a node 120 joins the global DHT network 110$_G$ and a local DHT network 110$_L$, the global information associated with the set of global information tables 121$_G$ for the node 120 and the local information associated with the set of local information tables 121$_L$ for the node 120 is logically separate and distinct. This logical separation of global and local information on a node 120 may be provided in any suitable manner.

In one embodiment, for example, the logical separation of global and local information on a node 120 is provided using separate information tables 121 (as depicted in FIG. 1).

In one embodiment, for example, the logical separation of global and local information on a node 120 is provided using a single physical information table 121 or set of information tables 121 (e.g., the information may be controlled in any suitable manner for enabling the node 120 to distinguish between global and local information). For example, where a node 120 is responsible for a file in both the global DHT network 110$_G$ and the local DHT network 110$_L$, and has a list of peer nodes associated with that file for the global DHT network 110$_G$ (e.g., 1, 8, 9, 14, 15, 16, 17, 20) and has a list of peer nodes associated with that file for the local DHT network 110$_L$ (1, 15, 17, and 20), the node 120 may store a single entry for that file as follows: 1(L), 8, 9, 14, 15(L), 16, 17(L), 20(L), where each node identifier that is indexed with "L" is understood by the node 120 to be included in both the local peer node information for local DHT network 110$_L$ and the global peer node information for global DHT network 110$_G$.

It will be appreciated that combinations of such embodiments also may be used for providing logical separation of global and local information on a node 120.

In such embodiments, based on the logical separation of global and local information at a node 120, the operations of the node 120 within the global DHT network 110$_G$ may be separated from operations of the node 120 within its local DHT network 110$_L$. It will be appreciated that such operations may include any operations which may be performed within DHT networks (e.g., operations such as routing, announcing, querying, and the like).

It is noted that, due to the independence of global DHT network 110$_G$ from each of the local DHT networks 110$_L$, the local DHT networks 110 do not necessarily need to be implemented as DHT networks (and, thus, may be referred to more generally herein as local P2P networks 110$_L$ or local networks 110$_L$); rather, the local P2P networks 110 may be implemented using any other suitable type(s) of P2P networks (e.g., an unstructured P2P network, a P2P network running the gossip protocol, and the like). It is further noted that the local P2P networks 110 do not necessarily require an additional merging process in order to construct a global DHT network (because the multi-layer P2P capability adds local DHT networks to an existing global DHT network rather than constructing a global DHT network from scratch) while still preserving the various advantages of a hierarchical DHT system (such as lookup locality and fast lookup time).

It is noted that, while the independence of the local DHT networks 110$_L$ from the global DHT network 110$_G$ ensures that the multi-layer DHT system 100 is flexible (including more flexible than existing DHT systems) as well as compatible with existing P2P systems and applications, the maintenance overhead associated with maintenance of the multi-layer DHT system 100 may be greater than that required for existing DHT systems (e.g., due to the use of multiple additional DHT networks). It is further noted that, if the DHT networks 110 shared a single routing table, the overhead would decrease at the expense of a loss of independence between the DHT networks 110. In other words, there is a tradeoff between compatibility and overhead.

In one embodiment, in general, a node 120 is configured to join a root DHT network of a root layer of the multi-layer DHT system and at least one DHT network of at least one sub-layer of the multi-layer DHT system. In one such embodiment, the root DHT network includes all nodes 120 participating in the multi-layer DHT system and each DHT network of a sub-layer of the multi-layer DHT system includes a subset of the nodes of the layer that is above it in the hierarchy of the multi-layer DHT system.

In one such embodiment, as depicted in FIG. 1 for example, the global layer (including global DHT network 110$_G$) is the root layer of the exemplary multi-layer DHT system 100 and the local layer (including local DHT networks 110$_L$) is a sub-layer of the exemplary multi-layer DHT system 100.

In one embodiment, a node 120 is configured to be able to join the global DHT network 110$_G$ and its local DHT network 110$_L$. The nodes 120 may join DHT networks 110 using any suitable mechanism(s) for joining DHT networks (e.g., one or more of discovery protocols, membership protocols, bootstrapping, and the like, as well as various combinations thereof).

In one embodiment, a node 120 joins the global DHT network 110$_G$ using a process that would typically be used by the node 120 to join the DHT network of a DHT system.

In one embodiment, a node 120 joins the local DHT network 110$_L$ by enabling identification of which of the available local DHT networks 110$_L$ is intended to support nodes 120 having the characteristic(s) matching the characteristic(s) of the node 120. For example, within the context of the mechanism(s) to be used to join a local DHT network 110$_L$ (e.g., discovery protocol, membership protocol, bootstrapping, and the like) the node 120 may initiate a request configured for enabling a network element receiving the request (e.g., another node 120, a bootstrapping server, and the like) to identify which local DHT network 110$_L$, of the available local DHT networks 110$_L$, the node 120 should join. For example, the request may include one or more of the IP address of the node 120 (e.g., which may be used for determining an ISP with which it is associated, its geographic location, and/or any other suitable characteristic(s) upon which the localization of the local DHT networks 110 may be based), the Autonomous System (AS) number of the node 120, the ISP name of the ISP from which the node 120 receives server, the geographic location of node 120, and the like, as well as various combinations thereof.

In one embodiment, the multi-layer DHT system 100 is configured to support one or more bootstrapping capabilities for use by nodes 120 in joining DHT networks 110.

In many DHT systems, when a joining node tries to connect to the DHT network and it does not know enough nodes of the DHT network, the joining node uses bootstrapping (e.g., by contacting a bootstrapping node whose IP address is available in the client application on the node (e.g., hardcoded in the source code of the client application on the node)).

In one embodiment, a node 120 may use bootstrapping to join the global DHT network 110$_G$. For example, a node 120, when joining the global DHT network 110$_G$, may contact a bootstrapping server associated with the global DHT network 110$_G$ (e.g., using an IP address of the bootstrapping server that is stored on the node 120).

In one embodiment, a node 120 may use bootstrapping to join the local DHT network $110_L$. In one embodiment, for example, a local DHT network $110_L$ is configured to include a local bootstrapping server, where the local bootstrapping server stores a list of local nodes which may be helpful for the local DHT network $110_L$. In one embodiment, for example, assuming that a node 120 is already connected to the global DHT network $110_G$, the global DHT network $110_G$ may be used by the node 120 as a virtual bootstrapping node (instead of deploying a physical bootstrapping server within the global DHT network $110_G$ or physical bootstrapping servers within the local DHT networks $110_L$).

Figure 2:
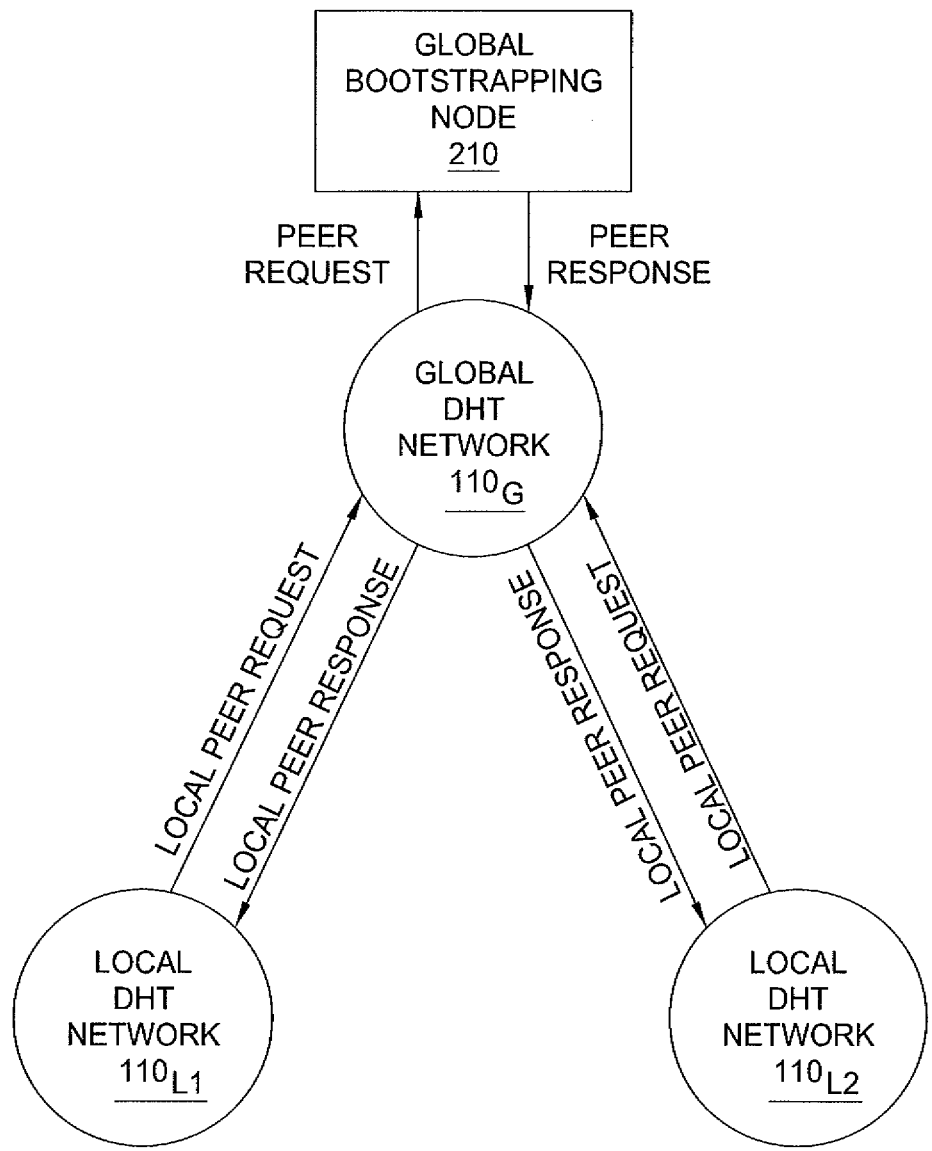
FIG. 2 depicts an exemplary embodiment illustrating use of a global DHT network as a virtual bootstrapping node for a local DHT network.

Various embodiments of such bootstrapping capabilities are depicted and described with respect to FIG. 2.

FIG. 2 depicts an exemplary embodiment illustrating use of a global DHT network as a virtual bootstrapping node for a local DHT network.

As depicted in FIG. 2, an exemplary multi-layer DHT system 200 supports various bootstrapping capabilities. The exemplary multi-layer DHT system 200 of FIG. 2 includes the exemplary multi-layer DHT system 100 of FIG. 1, as well as a global bootstrapping node 210 (not depicted in FIG. 1).

The exemplary multi-layer DHT system 200 supports a bootstrapping capability for nodes 120 of global DHT network $110_G$.

The exemplary multi-layer DHT system 200 also support bootstrapping for local DHT networks $110_L$ using global DHT network $110_G$ as a virtual bootstrapping node.

In one embodiment, the first time that a node 120 joins its local DHT network $110_L$, the node 120 queries the global DHT network $110_G$ in order to obtain a list of local nodes 120 of its local DHT network $110_L$. For example, the node 120 may send a request message to the global DHT network $110_G$ in order to obtain a list of local nodes 120 of its local DHT network $110_L$ (denoted as LOCAL PEER REQUEST) and, in response, receive a list of local nodes 120 of its local DHT network $110_L$ (denoted as LOCAL PEER RESPONSE). The request message may include any information suitable for enabling a network element receiving the request (e.g., one of the nodes 120 of the global DHT network $110_G$) to determine the local DHT network $110_L$ that the node 120 should join based on its localization characteristic or characteristics (e.g., IP address, AS number, ISP name, geographic location, and the like, as well as various combinations thereof). In this manner, the node 120 also announces its own information (e.g., IP address and the local DHT network $110_L$ with which it is associated) to the global DHT network $110_G$ so that other nodes 120 can find it.

In an embodiment in which the global DHT network $110_G$ is used as a virtual bootstrapping node for the local DHT networks $110_L$, the associated query/announce functions may be performed in any suitable manner. In one embodiment, for example, for query and announce functions, a key and a value may be used, where a key indicates which local DHT network $110_L$ was joined by the node and a value identifies the node 120. The key may be specified using any suitable information (e.g., AS number, ISP name, and the like, as well as various combinations thereof). Similarly, the value may be specified using any suitable information (e.g., IP address of the node, port number of the node, and the like, as well as various combinations thereof).

In this manner, the global DHT network $110_G$ is used as a virtual database which stores the local peer information, such that there is no need to make any modification to the global DHT network $110_G$ in order to support bootstrapping in this manner (i.e., the typical store and lookup functions of the global DHT network $110_G$ are adequate).

In one embodiment, following the initial use of the global DHT network $110_G$ as a virtual bootstrapping node, the node 120 caches the local peer node information locally, thereby enabling the node 120 to bootstrap using local information (i.e., without querying the global DHT network $110_G$) when the node 120 subsequently joins the local DHT network $110_L$.

In one embodiment, the exemplary multi-layer DHT system 100 supports identification capabilities.

In general, in many DHT networks, identification is used for identifying nodes and files within a DHT network. It will be appreciated that identification may be provided in any suitable manner (e.g., using any suitable type(s) of values). In many DHT networks, for example, a hash value is used for identification of nodes and files. For example, Kademlia, one of the most popular types of DHT networks, uses 20-byte hash data for identification. It will be appreciated that other types of identifiers may be used. In general, the identification that is used for a DHT network is sent to other nodes when a node announces a file or sends a query for a file.

In one embodiment, identification with the global DHT network $110_G$ (e.g., for identification of nodes 120 and files with the global DHT network $110_G$) is provided in a manner as described above for typical DHT networks (e.g., using 20-byte hash data or any other suitable type(s) of identifiers).

In one embodiment, identification within each local DHT network $110_L$ (e.g., for identification of nodes 120 and files with the local DHT network $110_L$) is performed using the same hash data that is used for identification within the global DHT network $110_G$ (e.g., for identification of nodes 120 and files with the global DHT network $110_G$). There is no conflict due to reuse of the same hash data for the global DHT network $110_G$ and local DHT networks $110_L$, because the DHT networks 110 are disjoint. This type of arrangement also provides advantages in the performance of the lookup process, as described herein.

In one embodiment, the exemplary multi-layer DHT system 100 supports announce capabilities.

In general, in many DHT networks, a node sends multiple announce messages to nodes in the DHT network in order to advertise that it holds a file or a part of a file.

In one embodiment, a node 120 is configured to send two types of announce messages as follows: (1) a global-announce message which is sent by the node 120 within the global DHT network $110_G$ and (2) a local-announce message which is sent by the node 120 within its local DHT network $110_L$. In one such embodiment, the global-announce and local-announce messages sent by the node 120 are identical (with the exception of the DHT network 110 in which they are sent, respectively), such that it is possible that nodes 120 can receive two different types of announce messages from other nodes 120.

In one embodiment, the exemplary multi-layer DHT system 100 supports peer storage capabilities and lookup capabilities.

In general, in many DHT networks, peer storage capabilities and lookup capabilities are supported by the nodes for enabling the nodes to identify peer nodes which are storing files and, thus, to retrieve files.

Figure 3:
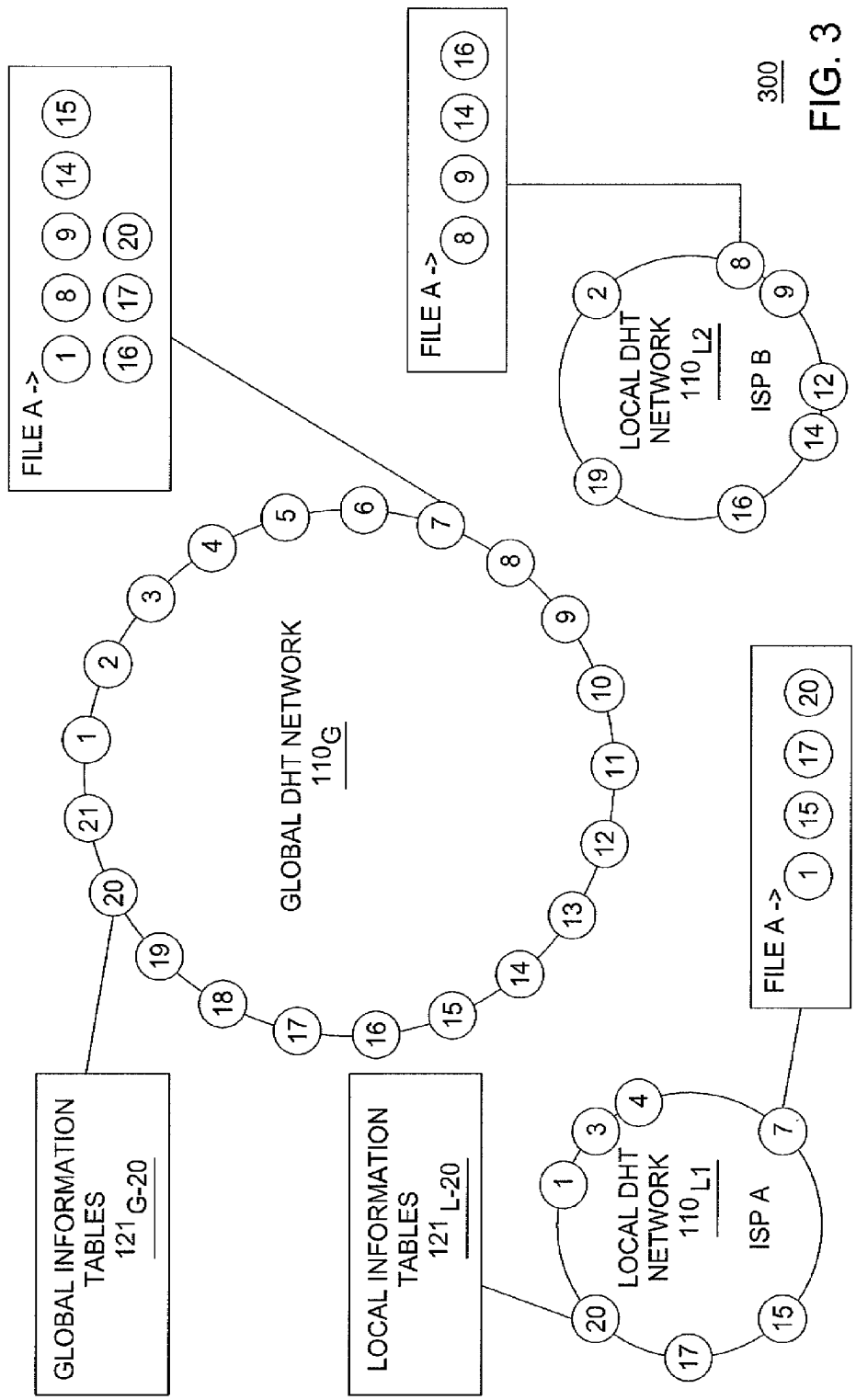
FIG. 3 depicts an exemplary use of the exemplary multi-layer DHT system of FIG. 1 for providing peer storage and lookup capabilities.

The peer storage capabilities and lookup capabilities of exemplary multi-layer DHT system 100 may be better understood by way of reference to FIG. 3.

FIG. 3 depicts an exemplary use of the exemplary multi-layer DHT system of FIG. 1 for providing peer storage and lookup capabilities. FIG. 3 depicts the global DHT network $110_G$ and local DHT networks $110_L$ depicted and described with respect to FIG. 1. FIG. 3 depicts peer storage tables that specify peer nodes 120 storing a file denoted as File A. FIG.

3 depicts a few of the peer storage tables 123 maintained within exemplary multi-layer DHT system 100 for File A, including: (1) node 7 maintains a global peer storage table $123_{G-7}$ including an entry for a File A, where the entry is indicative that File A is stored by global peer nodes (1, 8, 9, 14, 15, 16, 17, 20) which are part of global DHT network $110_G$; (2) node 7 maintains a local peer storage table $123_{L-7}$ including an entry for a File A, where the entry is indicative that File A is stored by local peer nodes (1, 15, 17, 20) which are part of local DHT network $110_{L1}$ to which node 7 belongs; and (3) node 8 maintains a local peer storage table $123_{L-8}$ including an entry for a File A, where the entry is indicative that File A is stored by local peer nodes (8. 9, 14, 16) which are part of local DHT network $110_{L2}$ to which node 8 belongs. Additional details associated with this exemplary use of the exemplary multi-layer DHT system of FIG. 1 are provided herein with respect to discussions of the peer storage and lookup capabilities supported by nodes 120 within the exemplary multi-layer DHT system 100.

In general, in many DHT networks, a node is responsible for a certain range of hash space. For example, a node which has a closest identification to the file identification (e.g., a hash value or any other suitable identifier) of a file is responsible for the file. As a result, the node maintains a peer storage table which stores, for each file for which the node is responsible, a list of peer nodes (e.g., pointers to the peer nodes) that are currently storing the file.

In one embodiment, this type of peer storage scheme is implemented in the global DHT network $110_G$ and, further, also is implemented in the local DHT network $110_L$. As a result, a node 120 belonging to both the global DHT network $110_G$ and a local DHT network $110_L$ is responsible for part of the hash space of the global DHT network $110_G$, as well as for part of the hash space of the local DHT network $110_L$. In this embodiment, the same files may be assigned to different nodes 120 in the local DHT network $110_G$, because not every node 120 in the global DHT network $110_G$ participates in the local DHT network $110_L$.

In one embodiment, as described hereinabove, given that a node 120 joins multiple logically separate DHT networks 110 (e.g., global DHT network $110_G$ and its local DHT network $110_L$), the node 120 may maintain multiple separate peer storage tables as follows: (1) a global peer storage table $123_G$ configured for storage of peer nodes 120 for the global DHT network $110_G$ and (2) a local peer storage table $123_L$ configured for storage of peer nodes 120 for the local DHT network $110_L$. In this embodiment, peer information is stored by a node 120, to either the global peer storage table $123_G$ or the local peer storage table $123_L$ of the node 120, based on the source of the announce message received by the node 120 which triggers such storage (i.e., peer nodes 120 determined by the node 120 from global-announce messages are stored to the global peer storage table $123_G$ of the node 120 and peer nodes 120 determined by the node 120 from local-announce messages are stored to the local peer storage table $123_L$ of the node 120).

As depicted in FIG. 3, for example, responsibility for File A in the various DHT networks 110 is maintained as follows: (1) node 7 in the global DHT network $110_G$ is responsible for File A and, thus, the global peer storage table $123_{G-7}$ of node 7 has a list of global peer nodes 120 (1, 8, 9, 14, 15, 16, 17, 20) of global DHT network $110_G$ from which File A is available; (2) node 7 in the local DHT network $110_{L1}$ is responsible for File A and, thus, the local peer storage table $123_{L-7}$ of node 7 has a list of local peer nodes 120 (1, 15, 17, 20) of local DHT network $110_{L1}$ from which File A is available; and (3) node 8 in the local DHT network $110_{L2}$ is responsible for File A and, thus, the local peer storage table $123_{L-8}$ of node 8 has a list of local peer nodes 120 (1, 15, 17, 20) of local DHT network $110_{L2}$ from which File A is available (e.g., node 8 is responsible because node 8 is the closest to node 7 of the nodes in local DHT network $110_{L2}$).

As described herein, providing such a separation of peer storage information within each node 120 (e.g., separation of the global peer storage table $123_G$ and local peer storage table $123_L$) facilitates localization of P2P traffic within the exemplary multi-layer DHT system 100.

In general, in many DHT networks, a lookup process is used by a node to identify a peer node of the DHT network that is storing a target file, such that the node performing the look can request the target file from the peer node that is responsible for the target file.

In one embodiment, a node 120 performs a lookup by sending two lookup messages as follows: sending a lookup message to the global DHT network $110_G$ with which the node 120 is associated and sending a lookup message to the local DHT network $110_L$. In this embodiment, the node 120 may begin to retrieve the target file from a peer node 120 that is storing the target according to one of the following: (1) if the first response received by the node 120 is from a peer node 120 associated with the local DHT network $110_L$, the node 120 may begin to retrieve the target file without waiting for a response from a peer node 120 associated with the global DHT network $110_G$; (2) if the first response received by the node 120 is from a peer node 120 associated with the global DHT network $110_G$, the node 120 may begin to retrieve the target file without waiting for a response from a peer node 120 associated with the local DHT network $110_L$ (e.g., the file may be retrieved from a node 120 that is associated with the global DHT network $110_G$, even though a later response may be received from a peer node that is associated with the local DHT network $110_L$, where retrieval of the target file from the peer node of the local DHT network $110_L$ would have been preferred over retrieval of the target file from the global DHT network $110_G$); or (3) if the first response received by the node 120 is from a peer node 120 associated with the global DHT network $110_G$, the node 120 may wait for a response from a peer node 120 associated with the local DHT network $110_L$ before requesting retrieval of the target file (e.g., since retrieval of the target file from a peer node 120 of the local DHT network $110_L$ is most likely preferred over retrieval of the target file from a peer node 120 of the global DHT network $110_L$). It is noted that a node 120 may use other types of logic for determining whether and/or when to retrieve a target file based on lookup response messages received by the node 120 from DHT networks 110.

In one embodiment, the node 120 performs a lookup in the local DHT network $110_L$ first, without performing an associated lookup in the global DHT network $110_G$. If the lookup-in the local DHT network $110_L$ is successful, the node 120 may retrieve the file from the peer node 120 identified during the lookup in the local DHT network $110_L$, and then there is no need for the node 120 to perform a lookup in the global DHT $110_G$. If the lookup in the local DHT network $110_L$ is not successful, the node 120 may then perform a lookup for the target file in the global DHT network 110G. In this embodiment, the node 120 is configured to prefer one or more DHT networks 110 over one or more other DHT networks 110 (e.g., preferring a local DHT network $110_L$ over a global DHT network $110_G$).

It is noted that various combinations of such embodiments (e.g., linear and/or contemporaneous lookups to DHT networks) may be used, thereby providing flexibility in balancing lookup latency (e.g., how fast a node can identify a node storing the target file) with file retrieval efficiency (e.g., how fast the node 120 can begin receiving the target file). For example, in a multi-layer DHT system that includes three layers (e.g., local, regional, global), the node 120 may utilize various combinations of linear and/or contemporaneous lookups, such as: (1) performing a lookup in the local DHT network first, and then performing respective lookups in the regional and global DHT networks contemporaneously if the lookup in the local DHT network fails; (2) performing contemporaneous lookups in the local and regional DHT networks first, and then performing a lookup in the global DHT network if the first two lookups both fail; (3) performing lookups in the local, regional, and global DHT networks linearly, where the next lookup is only performed in response to failure of the previous lookup. It is noted that various other combinations are possible.

It is noted that use of logically separate sets of configuration information (including separate sets of peer storage information) for the global DHT network $110_G$ and local DHT network $110_L$ of a node 120 facilitates at least some of the foregoing embodiments associated with peer node and file lookups.

In at least some such embodiments, a node 120 performs multiple lookups to multiple DHT networks 110 using separate sets of peer storage information maintained on the node 120 for the separate DHT networks 110.

For example, as a result of use of separate peer storage tables 123 for the global DHT network $110_G$ and the local DHT network $110_L$ at a node 120, a file lookup performed by the node 120 in the local DHT network $110_L$ will result in a lookup response message that is received from a local node 120 of the local DHT network $110_L$ and which only includes local peer nodes 120 which are located in the same DHT network 110. By contrast, use of a common peer storage table for both the global DHT network $110_G$ and local DHT networks $110_L$ would result in a file lookup result that would include random global peer nodes 120 instead of just local peer nodes 120.

As depicted in FIG. 3, for example, when a node 120 looks up File A in the local DHT network $110_{L1}$, it obtains a local peer node list of (1, 15, 17, 20) from the local peer storage table $123_{L-7}$ of node 7, because node 7 maintains a local peer storage table $123_{L-7}$ that is separate from its global peer storage table $123_{G-7}$. By contrast, if the node 7 were to maintain a common peer storage table rather than the separate peer storage tables, the node 120 performing the lookup would obtain a peer list of (1, 8, 9, 14, 15, 16, 17, 20), which is not localized.

It is noted that, even though each file lookup is performed twice in this embodiment, the lookup overhead on the local DHT network $110_L$ is negligible because its size is expected to be relatively small when compared to the size of the global DHT network $110_G$.

It is further noted that, assuming use of the same type of DHTs for the global DHT network $110_G$ and the local DHT network $110_L$, lookup latency and lookup message overhead of a DHT system including multiple DHT networks does not present a significant increase when compared to lookup latency and lookup message overhead of DHT systems including a single DHT network. The impacts on lookup latency and lookup message overhead are discussed below.

As noted above, the lookup latency does not increase when using the multi-layer DHT system 100. Using the same identification system, the target identification is identical in both the global DHT network $110_G$ and the local DHT network $110_L$. If the local lookup in the local DHT network $110_L$ fails, the recently found nodes 120 from the local DHT network $110_L$ are already very close to the identification of the target file. The local DHT network $110_L$ can provide the global DHT network $110_G$ with information about those nodes 120 as a hint for a global lookup in the global DHT network $110_G$ and, thus, the global DHT network $110_G$ can contact the nodes 120 which are already very close to the target file (instead of performing the lookup from scratch). As a result, the lookup latencies are always O(log N), regardless of the number of layers of the DHT system, and regardless of the associated numbers of DHT networks 110 of the layers and the associated sizes of the DHT networks 110.

As also noted above, and at least for the same reasons as discussed with respect to lookup latency, the lookup message overhead does not increase when using the multi-layer DHT system 100. If the size of the local DHT network $110_L$ is relatively large, the hop count of local lookup will be high; however, as already stated, once a lookup is performed in the local DHT network $110_L$ then it is already possible to find a node 120 close to the target node 120. As a result, the hop count of the global lookup will decrease while the number of nodes 120 in the local DHT network $110_L$ increases. This means that the total hop count of the multi-layer DHT system 100 (i.e., the sum of the local and global hop counts) is not affected. Additionally, it is noted that the local lookup is expected to be executed faster than the global lookup due to smaller round trip latencies to local nodes 120.

It is noted that, since a node 120 may join any suitable number of DHT networks associated with any suitable number of layers of the associated DHT system, the node 120 also may perform any suitable number of lookups using the DHT networks and/or arrangement of lookups using the DHT networks (e.g., using one or more linear and/or contemporaneous lookups).

Figure 4:
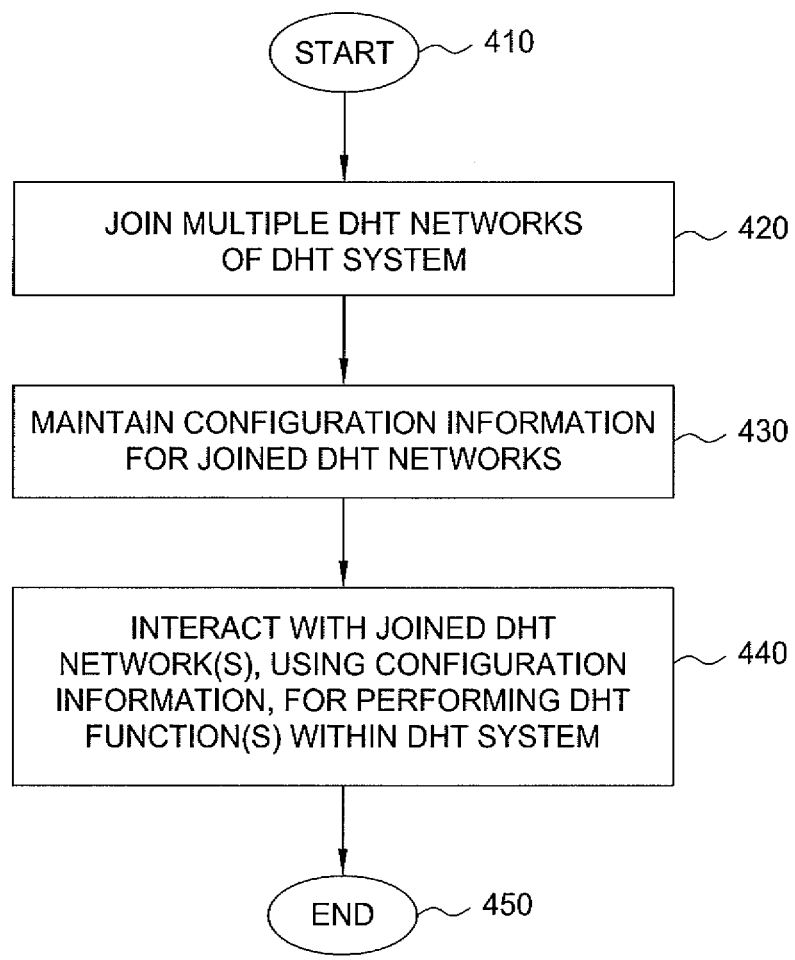
FIG. 4 depicts one embodiment of a method for enabling a node to use a multi-layer DHT system for performing P2P functions.

FIG. 4 depicts one embodiment of a method for enabling a node to use a multi-layer DHT system for performing DHT operations. The method 400 of FIG. 4 includes general steps for enabling a node associated with a DHT system to join multiple DHT networks and to interact with one or more of the DHT networks to perform various DHT operations within the DHT system. Accordingly, it is noted that any of the various DHT operations, functions, and/or capabilities depicted and described herein may be employed within the context of FIG. 4, such that any of the various DHT operations, functions, and/or capabilities depicted and described herein may be provided using one or more processes which may be executed by one or more processors on the node.

At step 410, method 400 begins.

At step 420, the node joins multiple DHT networks. The node may join any suitable number of DHT networks at any suitable number of layers of the DHT system. For example, the node may join a global DHT network and a local DHT network of the multi-layer DHT system, as primarily depicted and described herein. For example, the node may join first, second, and third DHT networks associated with first, second, and third layers of the multi-layer DHT system, respectively. Various other combinations are contemplated.

At step 430, the node maintains configuration information for the DHT networks joined by the node. For example, where the node joins first and second DHT networks, the node maintains a first set of configuration information configured for interaction by the node with the first DHT network and a second set of configuration information configured for interaction by the node with the second DHT network.

At step 440, the node interacts with one or more of the joined DHT networks, using the configuration information, for performing a DHT function(s) within the DHT system. The types of DHT functions which may be performed by the node 120 will be better understood by way of reference to FIGS. 1-3, which discuss various functions such as announce functions, peer node lookup functions, file lookup and retrieval functions, and like functions which may be performed within the context of a DHT system.

At step 450, method 400 ends.

As described herein, although primarily depicted and described herein with respect to a multi-layer DHT system including specific number of layers having specific scopes and specific numbers of DHT networks associated therewith, it is noted that a multi-layer DHT system may include any suitable number of layers having any suitable scope(s) and any suitable numbers of DHT networks associated therewith.

For example, a multi-layer DHT network may include three layers, where the highest layer is a global layer (e.g., the DHT network of the highest layer may include nodes from anywhere around the world), the middle layer is a continent-based layer (e.g., each DHT network of the middle layer includes nodes located on the associated continent), and the lower layer is a country-based layer (e.g., each DHT network of the lower layer includes nodes located within the associated country).

For example, a multi-layer DHT network may include four layers, where the highest layer is a continent-based layer (e.g., the P2P system is local to that continent and the DHT network of the highest layer includes nodes from anywhere within that country), the next-lower layer is a country-based layer (e.g., each DHT network of this layer includes nodes located within the associated country of that continent), the next-lower layer is a region-based layer (e.g., each DHT network of this layer includes nodes located within the associated sub-region of the associated country), and the lowest layer is an ISP-based layer (e.g., each DHT network of the lowest layer includes nodes receiving service from the associated ISP operating in that region of the country).

From the foregoing examples, it will be appreciated that a node 120 may join and interact with more than two DHT networks within the context of the associated P2P system.

For example, in the first (three-layer) example above, each node 120 may join the DHT network of the lower layer that is associated with the country in which it is located, the DHT network of the middle layer that is associated with the continent on which it is located, and the global DHT network. In this manner, each node 120 may have access to any suitable number of layers for providing any suitable scale of P2P localization (e.g., attempting first to interact only with peer nodes 120 located within the same country, then attempting to interact with peer nodes located on the same continent, and, finally, interacting with peer nodes 120 located anywhere in the world) when participating within the P2P system (e.g., identifying peer nodes, obtaining files, and performing like functions for which localization of traffic may be preferable).

Similarly, for example, in the second (four-layer) example above, each node 120 may join the DHT network of the lower layer that is associated with the ISP from which it receives service, the DHT network of the next-higher layer that is associated with the region of the country in which it is located, the DHT network of the next-higher layer that is associated with the country in which it is located, and the DHT network of the highest layer which is associated with the continent in which the country is located. Similarly, in this manner, each node 120 may have access to any suitable number of layers for providing any suitable scale of P2P localization (e.g., attempting first to interact only with peer nodes 120 receiving service from the same ISP, then attempting to interact with peer node 120 located within the same region of the country, then attempting to interact with peer nodes 120 located within the same country, then attempting to interact with peer nodes located on the same continent) when participating within the P2P system (e.g., identifying peer nodes, obtaining files, and performing like functions for which localization of traffic may be preferable).

From the foregoing examples, it will be appreciated that the global layer may be considered to be global in the sense that it encompasses the full set of nodes of the P2P system (which may or may not be of a geographically global scale). For example, for a P2P system available only within a particular country, the global layer may correspond to that country, and each lower layer may correspond to successively smaller portions of that country (e.g., in terms of geography, network association of nodes, and the like, as well as various combinations thereof). Accordingly, in at least some embodiments, the global layer and associated global DHT network may be referred to more generally as a highest layer and associated highest DHT network.

Although primarily depicted and described herein within respect to embodiments in which the networks 110 are DHT networks, it is noted that any of the networks 110 may be implemented using any other suitable type(s) of P2P networks. Accordingly, in various embodiments, the DHT networks 110 may be referred to more generally as P2P networks 110.

Figure 5:
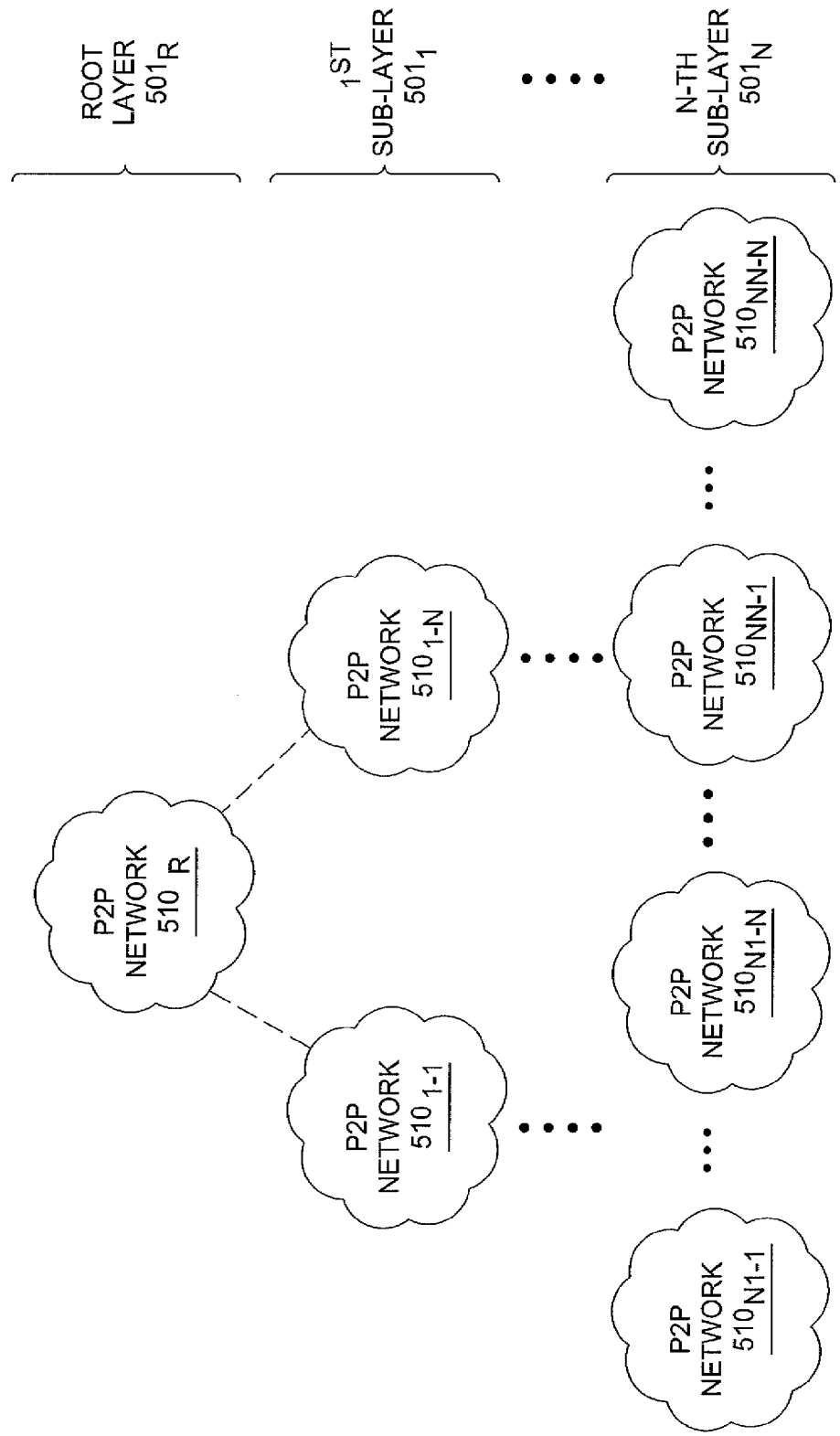
FIG. 5 depicts an exemplary multi-layer P2P system for illustrating a more general arrangement.

FIG. 5 depicts an exemplary multi-layer P2P system for illustrating a more general arrangement. The exemplary multi-layer P2P system 500 of FIG. 5 includes a root layer $501_R$ and a plurality of sub-layers $501_1$-$501_N$ (collectively, layers 501). The root layer $501_R$ includes an associated P2P network $510_R$, which includes all nodes participating in the exemplary multi-layer P2P system 500. The first sub-layer includes a plurality of P2P networks $510_{1\text{-}1}$-$510_{1\text{-}N}$. The N-th sub-layer $501_N$ includes N sets of P2P networks denoted as first set $510_{N1\text{-}1}$-$510_{N1\text{-}N}$ through N-th set $510_{NN\text{-}1}$-$510_{NN\text{-}N}$. Accordingly, as depicted in FIG. 5, a multi-layer P2P system may include any suitable number of layers each having any suitable number of associated P2P networks.

As described herein, the multi-layer P2P capability provides many advantages over single DHT systems, such as providing localization of P2P traffic of P2P file sharing networks in a manner providing benefits to both ISPs and end users, ensuring more local peers, being compatible with existing P2P systems, running without support of trackers, and the like.

Figure 6:
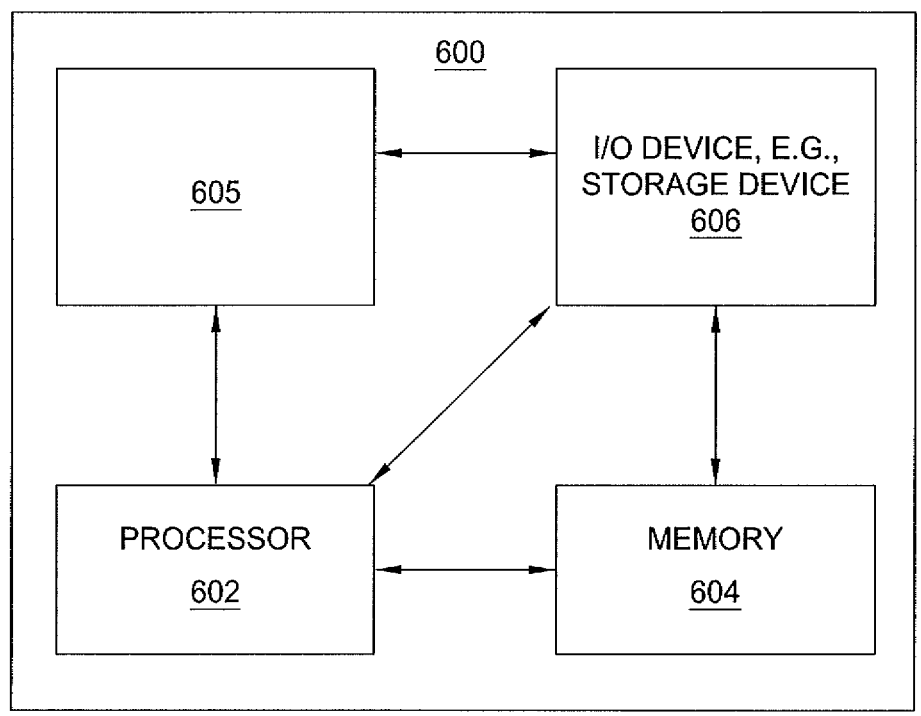
FIG. 6 depicts a high-level block diagram of a computer suitable for use in performing functions described herein.

FIG. 6 depicts a high-level block diagram of a computer suitable for use in performing functions described herein.

As depicted in FIG. 6, computer 600 includes a processor element 602 (e.g., a central processing unit (CPU) and/or other suitable processor(s)) and a memory 604 (e.g., random access memory (RAM), read only memory (ROM), and the like). The computer 600 also may include a cooperating module/process 605 and/or various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (i.e., via implementation of software on one or more processors) and/or hardware (e.g., using a general purpose computer, one or more application specific integrated circuits (ASIC), and/or any other hardware equivalents).

It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

In one embodiment, the cooperating process 605 can be loaded into memory 604 and executed by processor 602 to implement functions as discussed herein. Thus, cooperating process 605 (including associated data structures) can be stored on a computer readable storage medium, e.g., RAM memory, magnetic or optical drive or diskette, and the like.

It will be appreciated that computer 600 depicted in FIG. 6 provides a general architecture and functionality suitable for implementing functional elements described herein and/or portions of functional elements described herein. For example, the computer 600 provides a general architecture and functionality suitable for implementing one or more of the nodes 120, a portion of one or more of the nodes 120, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for use by a node in a peer-to-peer (P2P) system, comprising:
   a processor and a memory communicatively connected to the processor, the processor configured to:
      initiate a request for the node to join a first P2P network of the P2P system, the first P2P network comprising a plurality of peer nodes;
      initiate a request for the node to join a second P2P network of the P2P system, the second P2P network comprising a subset of the peer nodes of the first P2P network;
      maintain a first set of configuration information configured for interaction by the node with the peer nodes of the first P2P network and a second set of configuration information configured for interaction by the node with the peer nodes of the second P2P network;
      initiate a first file lookup within the second P2P network using the second set of configuration information, the first file lookup indicative of a request by the node to identify one of the peer nodes of the second P2P network that is storing a file; and
      initiate a second file lookup within the first P2P network using the first set of configuration information based on a determination that the first file lookup fails, the second file lookup indicative of a request by the node to identify one of the peer nodes of the first P2P network that is storing the file.

2. The apparatus of claim 1, wherein the processor is configured to prefer interaction with the first P2P network over interaction with the second P2P network for at least one function to be performed in the P2P system.

3. The apparatus of claim 2, wherein the at least one function comprises at least one of:
   performing a lookup to identify a peer node storing a file; and
   initiating a request for a file.

4. The apparatus of claim 1, wherein the processor is configured to initiate a peer node lookup by:
   initiating a first peer node lookup within the second P2P network; and
   when the first peer node lookup fails, initiating a second peer node lookup within the first P2P network.

5. The apparatus of claim 1, wherein the processor is configured to:
   initiate, contemporaneously, a third file lookup within the first P2P network using the first set of configuration information and a fourth file lookup within the second P2P network using the second set of configuration information, the third file lookup indicative of a request by the node to identify one of the peer nodes of the first P2P network that is storing a second file, the fourth file lookup indicative of a request by the node to identify one of the peer nodes of the second P2P network that is storing the second file; and
   control initiation of a request to retrieve the second file based on an order in which respective responses to the third file lookup and the fourth file lookup are received.

6. The apparatus of claim 1, wherein the processor is configured to initiate the second file lookup using a result from the first file lookup.

7. The apparatus of claim 1, wherein the processor is configured to bootstrap using the first P2P network as a virtual bootstrapping node for identifying at least one peer node of the second P2P network.

8. The apparatus of claim 1, wherein the processor is configured to initiate a first announce message toward the first P2P network and a second announce message toward the second P2P network.

9. The apparatus of claim 8, wherein the second announce message is configured to announce at least one of participation of the node within the second P2P network and storage of a file by the node for the second P2P network.

10. The apparatus of claim 1, wherein the first set of configuration information comprises at least one of:
    a routing table comprising routing information for the peer nodes of the first P2P network; and
    a peer node table comprising information configured for use in tracking peer nodes of the first P2P network.

11. The apparatus of claim 1, wherein the second set of configuration information comprises at least one of:
    a routing table comprising routing information for the peer nodes of the second P2P network; and
    a peer node table comprising information configured for use in tracking peer nodes of the second P2P network.

12. The apparatus of claim 1, wherein the first P2P network includes all peer nodes of the P2P system.

13. The apparatus of claim 1, wherein the second P2P network comprises a subset of peer nodes of the P2P system having a common characteristic associated therewith.

14. The apparatus of claim 13, wherein the common characteristic comprises at least one of being associated with a particular Internet Service Provider (ISP) and being located in a particular geographic area.

15. The apparatus of claim 1, wherein the first P2P network and the second P2P network are Distributed Hash Table (DHT)-based networks.

16. The apparatus of claim 1, further comprising:
a memory configured to store the first set of configuration information and the second set of configuration information.

17. A method for use by a node for participating in a peer-to-peer (P2P) system, comprising:
using a processor and a memory for:
initiating a request for the node to join a first P2P network of the P2P system, the first P2P network comprising a plurality of peer nodes;
initiating a request for the node to join a second P2P network of the P2P system, the second P2P network comprising a subset of the peer nodes of the first P2P network;
maintaining a first set of configuration information configured for interaction by the node with the peer nodes of the first P2P network and a second set of configuration information configured for interaction by the node with the peer nodes of the second P2P network;
initiating a first file lookup within the second P2P network using the second set of configuration information, the first file lookup indicative of a request by the node to identify one of the peer nodes of the second P2P network that is storing a file; and
initiating a second file lookup within the first P2P network using the first set of configuration information based on a determination that the first file lookup fails, the second file lookup indicative of a request by the node to identify one of the peer nodes of the first P2P network that is storing the file.

18. A non-transitory computer readable storage medium storing instructions which, when executed by a computer, cause the computer to perform a method for use by a node for participating in a peer-to-peer (P2P) system, the method comprising:
initiating a request for the node to join a first P2P network of the P2P system, the first P2P network comprising a plurality of peer nodes;
initiating a request for the node to join a second P2P network of the P2P system, the second P2P network comprising a subset of the peer nodes of the first P2P network;
maintaining a first set of configuration information configured for interaction by the node with the peer nodes of the first P2P network and a second set of configuration information configured for interaction by the node with the peer nodes of the second P2P network;
initiating a first file lookup within the second P2P network using the second set of configuration information, the first file lookup indicative of a request by the node to identify one of the peer nodes of the second P2P network that is storing a file; and
initiating a second file lookup within the first P2P network using the first set of configuration information based on a determination that the first file lookup fails, the second file lookup indicative of a request by the node to identify one of the peer nodes of the first P2P network that is storing the file.

19. An apparatus for use by a node for participating in a peer-to-peer (P2P) system, comprising:
a memory configured to store:
a first set of configuration information for interaction by the node with a first P2P network of the P2P system, wherein the first P2P network comprises a plurality of peer nodes; and
a second set of configuration information for interaction by the node with a second P2P network of the P2P system, wherein the second P2P network comprises a subset of the peer nodes of the first P2P network; and
a processor communicatively connected to the memory;
wherein the processor is configured to control interaction by the node with the first P2P network using the first set of configuration information and to control interaction by the node with the second P2P network using the second set of configuration information;
wherein the processor is configured to initiate a file lookup within the P2P system by:
initiating a first file lookup within the second P2P network using the second set of configuration information, the first file lookup indicative of a request by the node to identify one of the peer nodes of the second P2P network that is storing a file; and
initiating a second file lookup within the first P2P network using the first set of configuration information based on a determination that the first file lookup fails, the second file lookup indicative of a request by the node to identify one of the peer nodes of the first P2P network that is storing the file.

\* \* \* \* \*